Sept. 14, 1965 E. H. LAND ETAL 3,205,797
ILLUMINATION RESPONSIVE PHOTOGRAPHIC SHUTTER APPARATUS
Filed March 29, 1963 7 Sheets-Sheet 1

INVENTORS
Edwin H. Land
BY  Milton S. Dietz
Brown and Mikulka
ATTORNEYS

Sept. 14, 1965  E. H. LAND ETAL  3,205,797
ILLUMINATION RESPONSIVE PHOTOGRAPHIC SHUTTER APPARATUS
Filed March 29, 1963  7 Sheets-Sheet 2

INVENTORS
Edwin H. Land
Milton S. Dietz
BY
Brown and Mikulka
ATTORNEYS

Sept. 14, 1965 E. H. LAND ETAL 3,205,797
ILLUMINATION RESPONSIVE PHOTOGRAPHIC SHUTTER APPARATUS
Filed March 29, 1963 7 Sheets-Sheet 3

INVENTOR.
Edwin H. Land
BY Milton S. Dietz
Brown and Mikulka
ATTORNEYS

Sept. 14, 1965   E. H. LAND ETAL   3,205,797
ILLUMINATION RESPONSIVE PHOTOGRAPHIC SHUTTER APPARATUS
Filed March 29, 1963   7 Sheets-Sheet 4

INVENTORS
Edwin H. Land
and
Milton S. Dietz
BY
Brown and Mikulka
ATTORNEYS

Sept. 14, 1965  E. H. LAND ETAL  3,205,797
ILLUMINATION RESPONSIVE PHOTOGRAPHIC SHUTTER APPARATUS
Filed March 29, 1963  7 Sheets-Sheet 6

INVENTORS
Edwin H. Land
and
Milton S. Dietz
BY
Brown and Mikulka
ATTORNEYS

United States Patent Office 3,205,797
Patented Sept. 14, 1965

3,205,797
ILLUMINATION RESPONSIVE PHOTOGRAPHIC SHUTTER APPARATUS
Edwin H. Land, Cambridge, and Milton S. Dietz, Lexington, Mass., assignors to Polaroid Corporation, Cambridge, Mass., a corporation of Delaware
Filed Mar. 29, 1963, Ser. No. 268,880
20 Claims. (Cl. 95—10)

The present invention relates to photography and, more specifically, to exposure control apparatus wherein the duration of exposure is automatically controlled by the operation of a circuit which is responsive to the intensity of illumination received from the scene being photographed.

A photographic shutter mechanism having a pair of blades movable with respect to an aperture to initiate and terminate a photographic exposure therethrough is disclosed in the instant application. A switching circuit is provided to establish a time interval which accurately controls the duration of the exposure in response to the intensity of scene brightness. The electrical parameters of the circuit are established in such a manner that the time interval produces an exposure duration which is calculated to result in proper exposure of a photosensitive film, or the like, with regard to the relative sensitivity of the film, the intensity of brightness received thereby from the scene being photographed, and the size of the aperture through which exposure is effected. Means are provided for selectively varying the circuit response, whereby a different time interval may be established by the circuit in response to the same amount or intensity of light, and also for varying the size of the effective exposure aperture. The present invention is concerned primarily with the structure and manner of operation of the last-named means, as will appear more fully hereinafter.

It is a principal object of the present invention to provide, in an exposure control mechanism including means for automatically establishing a time interval which determines exposure duration in response to scene brightness, an element movable to change, simultaneously and in a cooperative manner, the size of the effective exposure aperture and the relationship between scene brightness and the automatically established time interval.

A further object is to provide a diaphragm wheel having a plurality of fixed openings selectively positionable to define the effective exposure aperture of a shutter device and having mounted for movement therewith a switching means adapted to alter, through movement of the wheel, electrical parameters of a circuit which is operatively associated with the shutter.

Another object is to provide, in an exposure control device including an electrical circuit adapted to establish automatically a time interval which determines exposure duration in response to light received from the scene being photographed, first means for moving an element of said device to produce a different exposure value at the same light levels, and second means for moving said element to cause the circuit to respond to a different range of light levels, while retaining the same relationship of exposure value and scene brightness.

Still another object is to provide a novel and improved photographic shutter apparatus which responds automatically to the brightness of the scene being photographed, and which may be used with a plurality of film sensitivities and under widely varying conditions of scene brightness.

Other objects of the invention will in part be obvious and will in part appear hereinafter.

The invention accordingly comprises the apparatus possessing the contruction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

The present invention comprehends a novel shutter mechanism which includes a pair of solid shutter blades constructed and arranged for covering and uncovering an exposure aperture. In order to effect exposure, one of the shutter blades is positioned in covering relation to the exposure aperture and is movable to an uncovering position relative thereto to initiate exposure. The other shutter blade is initially positioned to one side of the aperture and is movable, subsequent to movement of the first blade, to a covering position with respect to the aperture for terminating exposure therethrough. The shutter also includes movable aperture-defining means which may be positioned in registration with the optical axis of the camera to define the size of the aperture through which exposure is effected. The operation of the shutter blades in sequence to effect an exposure is controlled by the operation of an electronic switching circuit which controls a flow of electrical current to energize and deenergize a solenoid which forms a part of an electromagnet. The exposure provided by the shutter is a function of the intensity of light received from the scene being photographed. Therefore, the circuit includes photoresponsive means for varying electrical parameters of the circuit in response to variations in the intensity of such light.

Figure 1:
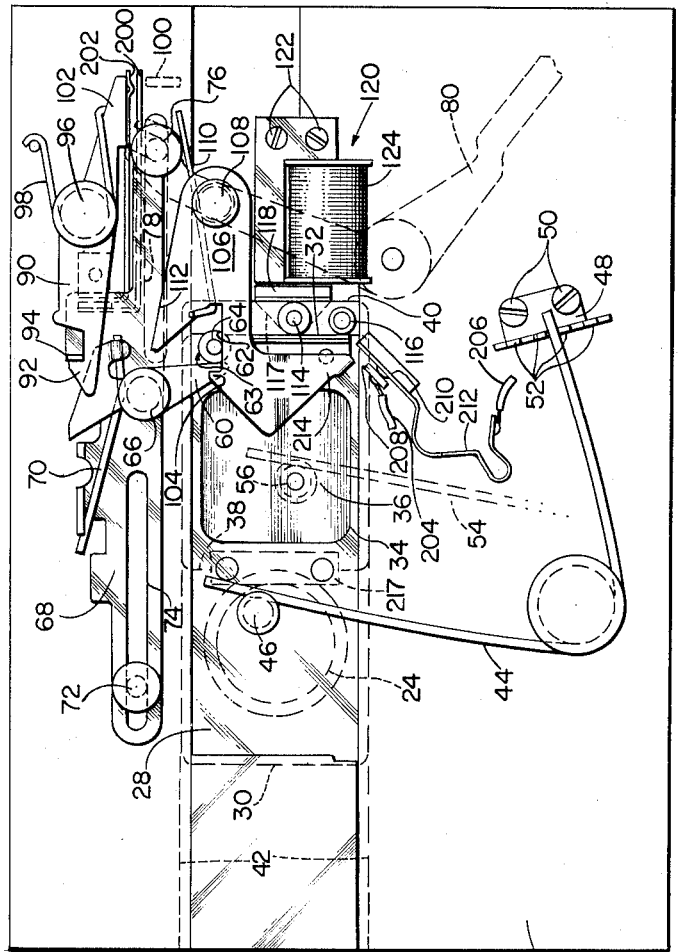
FIGURE 1 is a somewhat diagrammatic, plan view of a photographic shutter assembly embodying the present invention, the shutter housing being removed and the shutter being viewed from the side normally facing the exposure plane of a camera, the various elements of the shutter being shown in the initial or cocked position.
Figure 9:
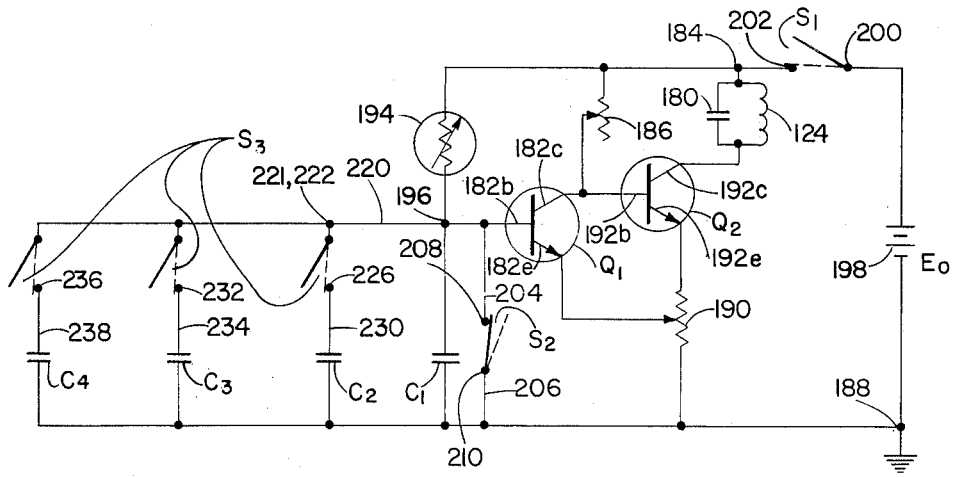
FIG. 9 is a schematic circuit diagram of an electrical circuit adapted to be associated with the shutter mechanism of the invention and to serve as a means for establishing a time interval determinative of the duration of exposures effected by the shutter.

Referring now to the drawings, like reference numerals are used to denote like parts among the several figures including the schematic counterparts in the circuit diagram of FIG. 9 of elements which are physically shown in other figures. Foundation means, such as base portion 20, is provided for mounting the operative elements of the shutter mechanism. Positioned in alignment with the optical axis of a photographic camera (not shown) with which the shutter apparatus of the present invention is adapted to be associated is aperture 24 which appears in diaphragm wheel 26, which will be described later in more detail. As shown in FIGURE 1, aperture 24 is covered by first shutter blade 28 which effectively occludes passage of light through the aperture. First shutter blade 28 includes leading edge 30, trailing edge 32, and opening 34 which, in the embodiment shown, is substantially square or rectangular in shape. Second shutter blade 36 includes leading edge 38 and trailing edge 40. It may be seen that in the position of FIGURE 1 leading edge 38 of second shutter blade 36 is positioned to one side of aperture 24 and is therefore in uncovering relation to the aperture.

Figure 7:
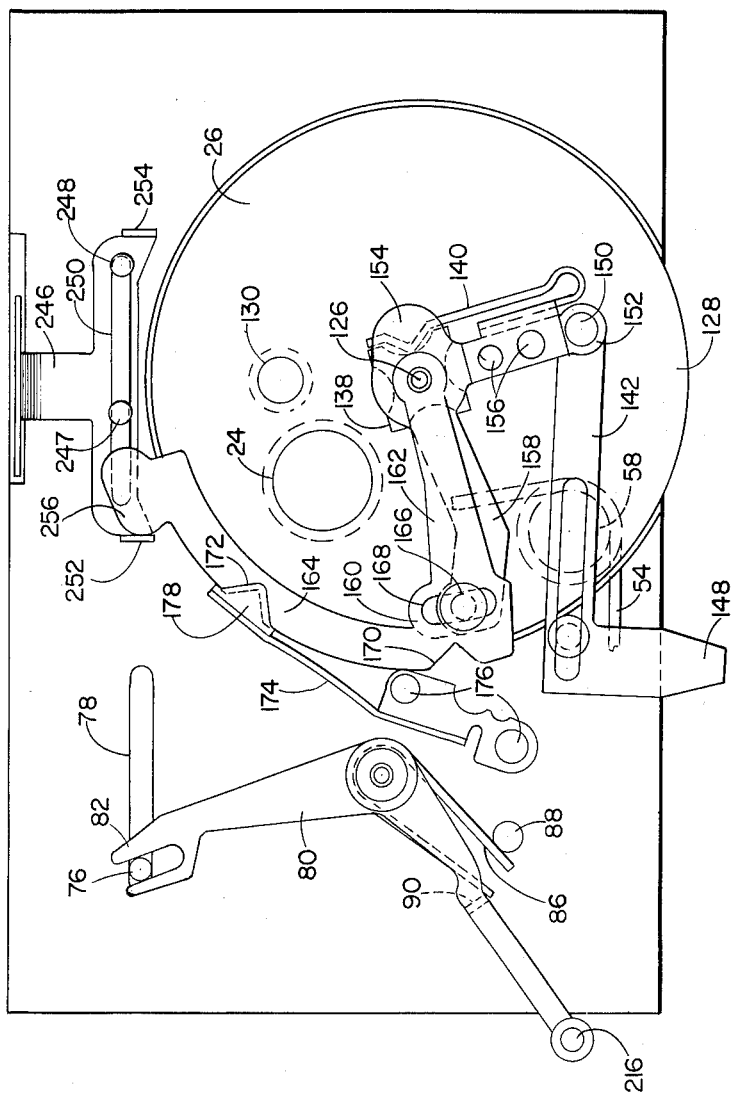
FIG. 7 is a front plan view of the shutter as seen in FIG. 4, the elements being shown in a second relative position of adjustment.

Both first and second blades 28 and 36 are mounted for reciprocal sliding movement in tracks 42 which are provided in base portion 20. At least that portion of base portion 20 which lies between tracks 42 in the area between the shutter blades and aperture 24 is cut away so that light may pass through the aperture and past the plane of the base portion when the aperture is uncovered, as in FIG. 2. First blade 28 is biased for movement from right to left as seen in FIGURE 1 by spring 44. One end of spring 44 bears against fixed pin 46 on first blade 28, and the other end is held stationary by stop means 48 which are anchored to base portion 20 by screws 50. Stop means 48 include a plurality of teeth 52. The stationary end of spring 44 may be positioned between any two of teeth 52 to allow selective adjustment of the biasing force of spring 44 on first blade 28. Second blade 36 is biased from right to left as seen in FIGURE 1 by spring 54 which bears on fixed pin 56, extending from second blade 36 on the side thereof opposite first blade 28. As best seen in FIG. 7, spring 54 extends from its biasing contact with pin 56 around fixed mounting 58, and is held stationary at the other end by appropriate stop means (not shown) on base portion 20.

First blade 28 is retained in the position of FIGURE 1 by contact of ear portion 60 with large diameter 62 of fixed pin 63 which extends from first blade 28, and also includes small diameter 64, extending outwardly from the blade a greater distance than large diameter 62. Ear 60 is pivotally mounted upon pin 66 on release slide 68, and biased in a clockwise direction, as seen in FIGURE 1, about pin 66 by spring 70. The bias of spring 70 on ear portion 60 is preferably stronger than the bias of spring 44 on pin 46, whereby first blade 28 is retained in the position shown in FIGURE 1 by the force of ear portion 60 on large diameter 62; that is, the force of spring 44, acting through pin 63 on ear 60, is not strong enough to result in counterclockwise rotation of ear 60 against the bias of spring 70.

Figure 4:
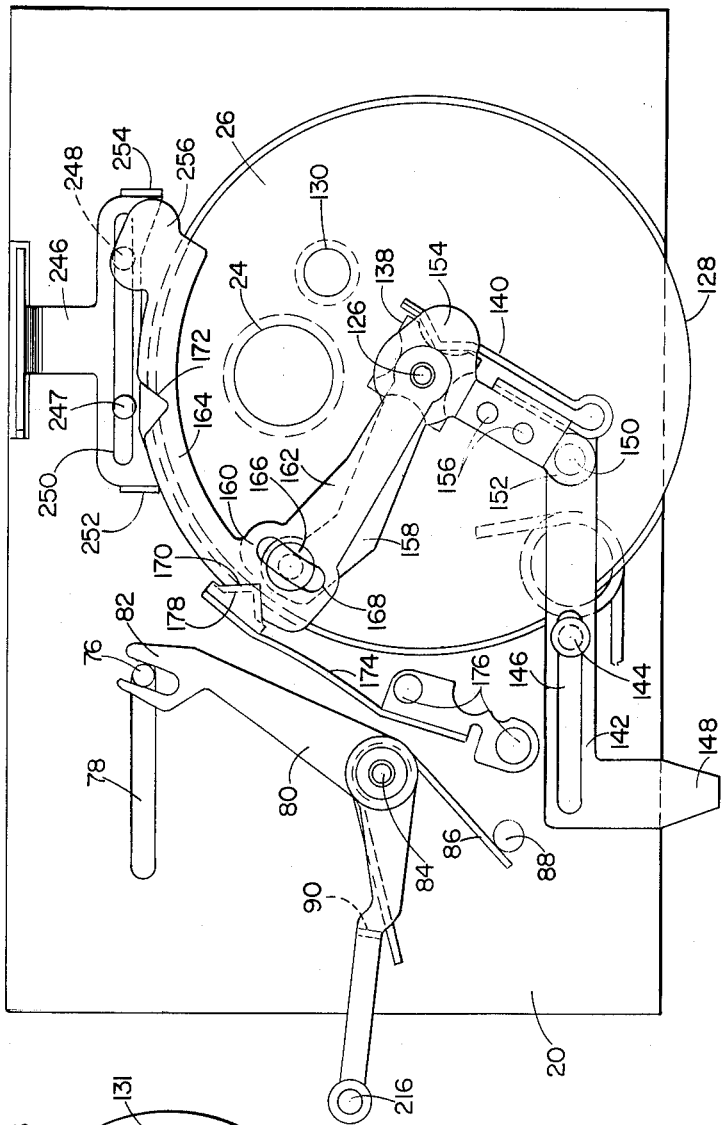
FIG. 4 is a front plan view of the shutter of FIGS. 1–3, the shutter housing being removed and the shutter being viewed from the side normally facing the scene which is photographed by operation of the shutter mechanism.

Release slide 68 is mounted for reciprocal sliding movement upon fixed pin 72 which extends from base portion 20 through elongated slot 74 in release slide 68, and fixed pin 76 which extends from release slide 68 through elongated slot 78 in base portion 20. The end of pin 76 opposite that shown in FIGURE 1 may be seen in FIGS. 4 and 7 extending through slot 78. Cocking lever 80 includes end portion 82 which engages the end of pin 76 seen in FIGS. 4 and 7. Cocking lever 80 is pivotally mounted upon fixed pin 84, which extends from base portion 20, and is biased for movement about pin 84 in a clockwise direction, as seen in FIGS. 4 and 7, by spring 86. Pin 88 on base portion 20 provides a fixed stop for one end of spring 86, which passes around pin 84 and engages, at its other end, extending portion 90 of cocking lever 80.

When the shutter elements are in the cocked position of FIGURE 1, cocking lever 80 is in the position shown in FIG. 7. Thus, it may be seen that the biasing force exerted by spring 86 will be transmitted, through cocking lever 80, to pin 76 and therefore to release slide 68. When in the position of FIGURE 1, release slide 68 is consequently biased for movement from right to left as seen in this figure. Release slide 68 is retained in the position of FIGURE 1 by rotatable element 90, including latching portion 92 which engages tab 94 on release slide 68. Rotatable element 90 is mounted upon pin 96, extending from base portion 20 and is biased toward clockwise movement thereabout, as seen in FIGURE 1, by spring 98.

Figure 11:
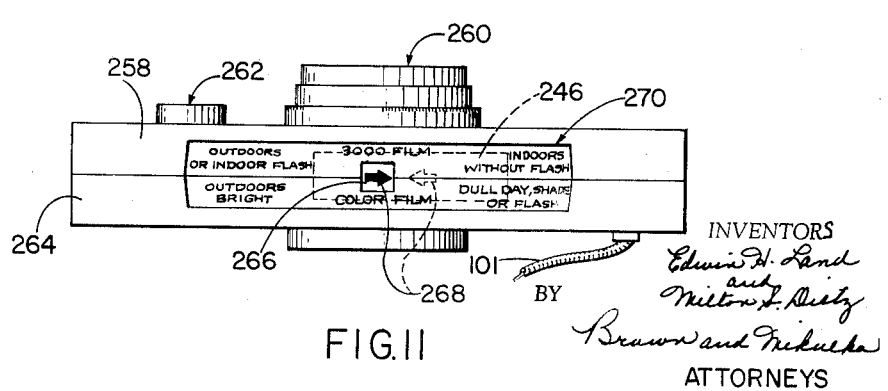
FIG. 11 is a top plan view of the shutter housing in FIG. 10.

Exposure-initiating movement of the shutter elements is commenced by rotating element 90 in a counterclockwise direction about its pivotal mounting on pin 96, whereby latching portion 92 releases tab 94 and release slide 68 is free to move, as seen in FIGURE 1, under the biasing force of spring 86, transmitted to the release slide through cocking lever 80. Any convenient means previously known in the art may be used to move rotatable element 90 for setting the parts in motion to initiate exposure. For example, the camera with which the shutter of the present invention is associated may be provided with the usual, manually-engageable shutter release member, such as a depressible button or the like. Such shutter release member may comprise, or may be operatively connected to, movable member 100, which is shown diagrammatically in dotted lines in FIGS. 1–3. Movable member 100 may be associated in any well known manner with the shutter elements for movement between the positions of FIGS. 1 and 2 in response to manual movement by the operator of the manually engageable shutter release member. For example, as seen in FIG. 11, a conventional cable release 101 may lead from a depressible button to engage member 100. Manual movement of the button is transmitted through the cable to member 100 and any well-known means may be provided to return the elements to their original positions when released.

Figure 2:
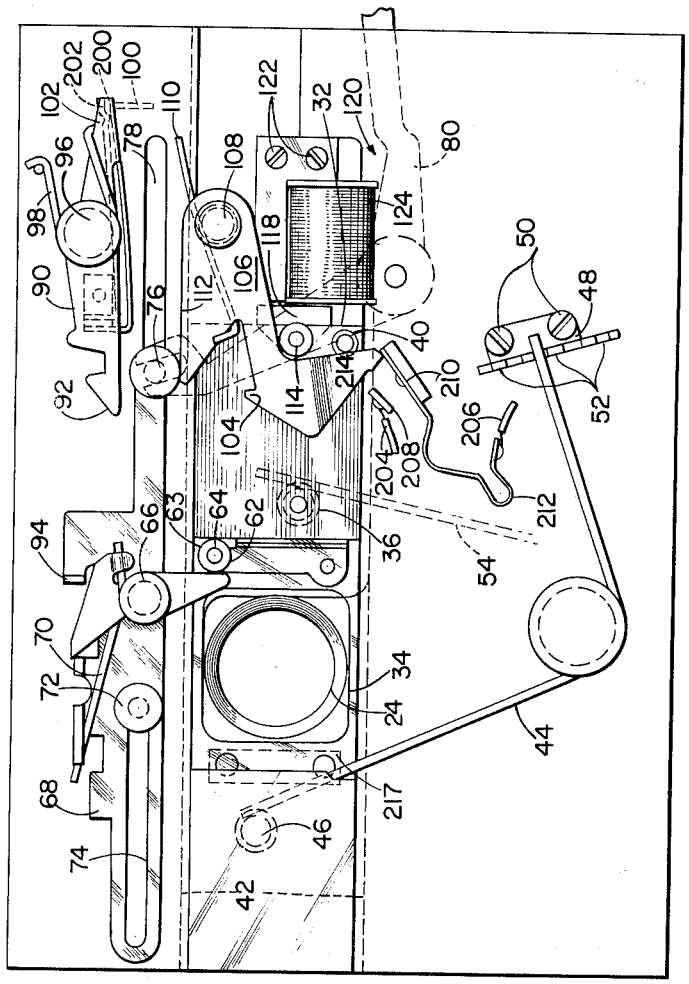
FIG. 2 is also a plan view of the shutter of FIGURE 1, the elements being shown in the exposure position, that is, with the exposure aperture uncovered to permit passage of light.

As may be seen from FIG. 2, movable element 100 is adapted to engage tail portion 102 of rotatable element 90, and move the element so that latching portion 92 becomes disengaged from tab 94 on release slide 68. Upon such disengagement, release slide 68 moves from the position of FIGURE 1 towards the position of FIG. 2 by virtue of the force exerted on pin 76 by spring-biased cocking lever 80. As release slide 68 begins to move, first blade 28 moves therewith since ear portion 60, which initially retains the first blade in its initial position, moves with the release slide. Small diameter 64 of fixed pin 63 extending from first blade 28 is engaged by latching portion 104 of element 106 which is pivotally mounted on pin 108, extending from base portion 20. Element 106 is biased towards clockwise rotation about pin 108 by spring 110. As release slide 68 continues to move from right to left the periphery of pin 76 engages surface 112 of element 106 and rotates the element in a counterclockwise direction about its pivotal mounting on pin 108 against the bias of spring 110. This rotation of element 106 causes latching portion 104 thereof to release small diameter 64 of fixed pin 63, thus releasing first blade 28 for movement, under the bias of spring 44, to the position of FIG. 2. Appropriate means (not shown) are provided on base portion 20 for stopping first blade 28 in the position of FIG. 2. When first blade 28 has been moved to the position of FIG. 2 opening 34 is in registration with aperture 24, permitting the passage of light therethrough.

When first blade 28 is retained in its position of FIGURE 1, by the means previously described, second blade 36 is retained in its initial position against the bias of spring 54 by contact of trailing edge 32 of first blade 28 with pins 114 and 116 on second blade 36. Pin 114 also serves as a pivotal mounting for element 117 which includes keeper 118, extending beyond trailing edge 40 of second blade 36. When in the position of FIGURE 1 keeper 118 is held in contact with the pole pieces of electromagnet 120, which is secured to base portion 20 by means of screws 122. Electromagnet 120 may be energized to exert a magnetic attraction on keeper 118 by passage of an electrical current through solenoid 124. The circuit diagram of FIG. 9 includes a schematic showing of solenoid 124 and the flow of energizing current through the solenoid is controlled by operation of the circuit, which will be explained in greater detail hereinafter. Thus, when first blade 28 moves to its position of FIG. 2, second blade 36 may be retained in its initial position by supplying an energizing current to solenoid 124 which causes electromagnet 120 to attract keeper 118. When the current to solenoid 124 is cut off, or is diminished to such an extent that the attracting force of electromagnet 120 on keeper 118 is less than the biasing force of spring 54 on pin 56, second blade 36 will be moved under the bias of spring 54 to its position of FIG. 3. Second blade 36, when in the position of FIG. 3, covers aperture 24, thus terminating the exposure which was initiated by movement of first blade 28 from its position of FIGURE 1 to that of FIG. 2.

Figure 5:
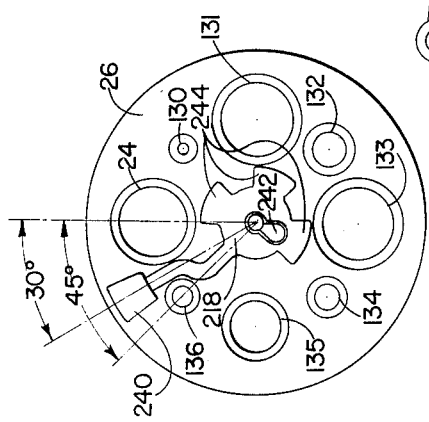
FIG. 5 is a rear plan view of selected elements of shutter as shown in FIG. 4, particularly the aperture defining means, viewed from the side opposite to that seen in FIG. 4.

Turning now to FIG. 4, diaphragm wheel 26 is rotatably mounted at its center upon pin 126 which extends from base portion 20, in such a manner that a portion 128 of diaphragm wheel 26 extends beyond an edge of base portion 20. As shown in FIG. 4, aperture 24 of diaphragm wheel 26 is in registration with the optical axis of the camera with which the shutter is associated and therefore defines the aperture through which exposure is effected by operation of the shutter. Diaphragm wheel 26 is shown in more detail in FIG. 5, wherein it may be seen that, in addition to aperture 24, diaphragm wheel 26 contains seven other apertures, numbered 130–136. The centers of all eight apertures in diaphragm wheel 20 lie on a circle having pin 126 as its center, and are each angularly spaced from one another by an equal amount, in the present embodiment 45°. Any of these eight apertures may be positioned in registration with the optical axis of the camera, in the position occupied by aperture 24 in FIG. 4, to define the aperture through which exposure is effected.

Two separate detent or stop means are provided for fixing the position of diaphragm wheel 26 relative to the optical axis of the camera. Fixed hub 138 on diaphragm wheel 26 includes four depressions which may be engaged by spring 140. These four depressions are equally angularly spaced, that is, at 90° from one another, and the center of each depression is radially aligned with the center of one of the eight apertures in diaphragm wheel 26. Portion 128 of diaphragm wheel 26 may be manually engaged by the operator and rotated in either direction until spring 140 engages the next depression in hub 138. (The numeral 128 is intended to represent any portion of diaphragm wheel 26 which extends beyond the edge of base portion 20. As the wheel is rotated this portion, of course, changes to include a different portion of the periphery of diaphragm wheel 26. It is to be understood therefore that the numeral 128 does not designate any fixed portion of the diaphragm wheel.) Since diaphragm wheel 26 includes eight apertures which are equally angularly spaced from one another, and fixed hub 138 includes only four equally angularly spaced depressions which may be engaged by spring 140, it should be apparent that rotation of wheel 26 from engagement of one depression to the next in hub 138 will position every other aperture in registration with the optical axis of the camera. That is, if aperture 24 is initially positioned as shown in FIG. 4, and diaphragm wheel 26 is then rotated by manual engagement of portion 128 until the next succeeding depression in hub 138 is engaged by spring 140, either aperture 131 or aperture 135 will then be in the position initially occupied by aperture 24, depending on the direction of rotation of the wheel. Therefore, manual rotation of diaphragm wheel 26 by engagement of portion 128 thereof, will position any of four of the eight apertures in the wheel in registration with the optical axis of the camera. The four apertures which are so positioned will be alternating apertures; that is, no two successive apertures may be positioned in registration with the optical axis by rotation of wheel 26 through manual engagement of portion 128 thereof.

Slide 142 is mounted for movement between the positions of FIGS. 4 and 7 on pin 144 which extends from base portion 20 through elongated slot 146. Slide 142 includes, at one end thereof, manually engageable tab 148 which extends beyond an edge of base portion 20 in the same manner as portion 128 of diaphragm wheel 26. Spring 140 is anchored, as by rivets 156 to one leg of L-shaped element 154 which includes a second leg 158, and is rotatably mounted upon pin 126 at or near the juncture of the two legs. Element 160 includes leg portion 162 and arcuate portion 164. Leg portion 162 is rotatably mounted on pin 126 and is fixedly attached, near its juncture with arcuate portion 164, to the end of leg 158 of element 154. The fixed connection is effected by set screw 166 which extends through elongated opening 168 and element 160 to engage element 154. Arcuate portion 164 of element 160 includes notches 170 and 172 in the outer periphery thereof. Detent spring 174 is fixedly mounted, as by rivets 176 upon base portion 20 and includes engagement portion 178 on the end remote from the fixed mounting. Engagement portion 178 is adapted to engage notches 170 or 172, thus retaining element 160 in a desired position.

By manual engagement of tab 148 slide 142 may be selectively moved between the positions of FIG. 4 and FIG. 7. Movement, for example, from the position of FIG. 4 to that of FIG. 7, causes rotation of element 154 in a counterclockwise direction as seen in these figures due to the pivotal connection by pin 150 of the end of slide 142 and end 152 of element 154. Such rotation of element 154 also causes rotation of element 160 due to the fixed connection of the two elements by set screw 166. Since spring 140 is fixedly mounted upon one leg of element 154 the spring is also rotated. This, in turn, produces rotation of diaphragm wheel 26 since the latter is freely rotatable upon pin 126 and spring 140 is engaged in one of the depression in fixed hub 138. As element 160 is rotated in a counterclockwise direction about its mounting on pin 126, engagement portion 178 of detent 174 is forced out of notch 170 and rides along the outer periphery of arcuate portion 164 until notch 172 is moved into registration therewith. Engagement portion 178 then engages notch 172 as shown in FIG. 7 and releasably fixes the elements in this position. The outer periphery of arcuate portion 164 lies on a circle having pin 126 as its center and notches 170 and 172 are angularly spaced at 45° from one another. Thus, movement of slide 142 by the engagement of tab 148 between the positions of FIGS. 4 and 7 rotates diaphragm wheel 26 by 45° in a counterclockwise direction when slide 142 is moved from left to right, and by 45° in a clockwise direction when slide 142 is moved from right to left as seen in FIGS. 4 and 7.

It may thus be seen that any of the eight apertures in diaphragm wheel 26 may be positioned in registration with the optical axis of the camera. Manual rotation of portion 128 of the diaphragm wheel positions alternate apertures in registration with the optical axis, and manual movement of slide 142 positions successive apertures in alignment therewith. For example, if aperture 24 is positioned as shown in FIG. 4, manual rotation of diaphragm wheel 26, by engagement of portion 128 thereof, in a counterclockwise direction will result in apertures 131, 133, 135 and 24, which thus may be characterized as a first group or set of apertures, being successively positioned in registration with the optical axis. Movement of slide 142 from the position of FIG. 4 to that of FIG. 7 will result in aperture 130 being positioned in registration with the optical axis as shown in FIG. 7. Manual rotation of diaphragm wheel 26, by engagement of portion 128 thereof, in a counterclockwise direction will then resulting apertures 132, 134, 136 and 130, which thus may be characterized as a second group or set of apertures, being successively positioned in registration with the optical axis. It is possible of course, to move slide 142 to its alternate position regardless of the position of diaphragm wheel 26.

The operation of the circuit shown schematically in FIG. 9 to control the duration of exposures effected by the shutter mechanism will now be explained. As previously mentioned, solenoid 124 comprises a portion of electromagnet 120 which is adapted to retain second blade 36 in its position after first blade 28 has been released. Premature release of second blade 36 by reducing the energizing current through solenoid 124 is prevented, and accurate control of the time for which second blade 36 is retained in its initial position is obtained by rapidly energizing the solenoid just prior to release of first blade 28, and effecting a rapid release of second blade 36 at the proper time. Solenoid 124 must be energized before first blade 28 begins to move away from its position of FIGURE 1 because this blade, through contact of trailing edge 32 thereof with pins 114 and 116 on closing blade 36, serves initially to position keeper 118 in engagement with the pole pieces of electromagnet 120. Once the keeper has separated even slightly from the pole pieces, the reluctance of the magnetic circuit is so high that the solenoid current is unable to produce an attractive force that will overcome the bias of spring 54 which urges second blade 36 away from its initial position.

Rapid release of the second blade 36 by electromagnet 120 can be accomplished by rapidly decreasing the current furnished to solenoid 124. When the current furnished to the solenoid is rapidly reduced, a voltage is induced thereacross due to the inductance of the solenoid. The induced voltage charges capacitor 180 which shunts the solenoid and prevents the induced voltage from damaging transistor $Q_2$. The current in the solenoid however, rapidly decays to the point where the magnetic induction is so reduced that the force of attraction of the pole pieces on keeper 118 is equal to the spring force urging separation. At this point, there is an initial movement of keeper 118 as second blade 36 is drawn away from the position of FIGURE 1 by the bias of spring 54. The time between the instant that the current in solenoid 124 is rapidly reduced and the instant that release of second blade 36 is accomplished is very small in terms of the ordinary exposure interval, being only a fraction of a millisecond. For this reason, it is considered that the current through the solenoid is reduced, and movement of the second blade 36 begins at substantially the same time.

For the reasons set forth above, namely rapid switching of the current input to the solenoid and low power consumption, the shutter timing apparatus takes the form of a transistorized, two-stage, modified Schmitt-type trigger circuit responsive to the output voltage from a selectively adjustable timing circuit for controlling the actuation and deactuation of electromagnet 120. The voltage sensitive trigger circuit has a normally not-conducting stage that includes transistor $Q_1$ having base, collector and emitter electrodes 182b, 182c and 182e respectively. Collector electrode 182c of $Q_1$ is connected to terminal 184 of the shutter timing apparatus by variable bias resistor 186, and emitter electrode 182e of $Q_1$ is connected to terminal 188 of the shutter timing apparatus by variable bias resistor 190. The normally conducting stage of the circuit includes transistor $Q_2$ having base, collector and emitter electrodes 192b, 192c and 192e. Collector electrode 192c is connected to terminal 184 through solenoid 124 so that the latter is energized when $Q_2$ conducts. Base electrode 192b of $Q_2$ is connected to collector electrode 182c of $Q_1$, and emitter electrode 192e of $Q_2$ is connected through bias resistor 190 to terminal 188. It should be noted that with this arrangement there is essentially a common emitter resistor the adjustment to resistor 190 being for the purpose of establishing the voltage at which it is desired to trigger the circuit. While the two stages of the circuit have been characterized as "normally not-conducting" and "normally-conducting" it should be obvious that this characterization is applicable only when a voltage source is applied across terminals 184 and 188.

A selectively adjustable timing portion of the circuit of FIG. 9 comprises R-C circuit means which includes photoconductive element 194, such as a cadmium sulfide photocell or the like, arranged to receive light from the scene being photographed and having a resistance functionally related to the intensity of light incident thereon. Also included are a plurality of capacitors $C_1$, $C_2$, $C_3$ and $C_4$, arranged in parallel circuit arrangement to one another and adapted to be placed in series, in some desired combination, with element 194. Switch means, designated collectively as S3, are shown schematically in FIG. 9 as adapted to selectively place any, all, or none of capacitors $C_2$, $C_3$ and $C_4$ in parallel with capacitor $C_1$. The purpose of switch S3, as well as its physical location and manner of operation in the illustrated embodiment of the invention, will appear later. The timing network comprising photoconductive element 194 and at least capacitor $C_1$ is connected between terminals 184 and 188 of the circuit so as to form a conventional integrator circuit whose input terminal is at 184 and whose output is at 196, the connection between the photoconductive element and the capacitance.

Voltage source 198, shown in the form of a battery of potential $E_0$, is connected between terminals 184 and 188 through normally open switch S1 so as to minimize current drain on the battery. Referring again to FIGURE 1, a pair of switch contacts 200 and 202 may be seen in proximity to tail portion 102 of element 90. These two contacts form switch S1 and may be seen to be open in the position of FIGURE 1, when the shutter is in the cocked position. As movable member 100 is moved to contact tail portion 102, it also moves contact 200 into engagement with contact 202, thus closing switch S1. The ends of the contacts are freely movable, of course, and are formed of a suitable conducting material, such as a springy metal, which causes them to return under their own force to the position of FIGURE 1 when member 100 is removed from contact therewith.

Lead 204 extends from a connection between output terminal 196 and base electrode 182b of $Q_1$, through normally closed switch S2, to lead 206 which is connected to terminal 188. Referring again to FIGURE 1, a pair of switch contacts 208 and 210, which form switch S2, are connected to leads 204 and 206 respectively. Contact 210 is on the movable end of spring 212, which is anchored at the other end to base portion 20 and may also form a part of the electrical circuit, connecting contact 210 to lead 206. Element 106 includes tail portion 214 which is adapted to engage and move contact 210, thus opening switch S2, when element 106 is moved from its position of FIGURE 1 to that of FIG. 2 through the previously-explained action of release slide 68. It may thus be seen that switch S2 is opened by tail portion 214 substantially simultaneously with release of small diameter 64 of the fixed pin on first blade 28 by latching portion 104.

The sequence of events that occur as a result of movement of element 100 from the position of FIGURE 1 to that of FIG. 2 will now be explained, assuming that switch S3 is positioned as shown in FIG. 9 so that the R-C circuit means consists only of photoconductive element 194 and capacitor $C_1$. The initial movement of element 100 closes the contacts of switch S1 before the rotation imparted to element 90 effects disengagement of latch portion 92 from tab 94 of release slide 68. Since human reaction time involved in moving the shutter release member, namely the time to move the member and release it, and the inertial delay of the member in returning to its normal position, substantially exceeds the longest average exposure apt to be used under normal "snap-shot" conditions of scene brightness, the contacts of switch S1 will be closed for at least as long as the correct exposure time.

$Q_2$ conducts almost instantaneously with the closing of switch S1 since the stage including $Q_2$ is essentially a common-emitter configuration utilizing fixed base current bias. The setting of variable resistor 186 establishes the degree to which $Q_2$ conducts so that the current through solenoid 124 can be adjusted to provide the proper magnetomotive force in the magnetic circuit of electromagnet 120 for preventing accidental release of second blade 36 when the first blade moves to initiate exposure. The flow of current through resistors 186 and 190, when $Q_2$ conducts, establishes at the collector and emitter electrodes of $Q_1$, bias voltages having first values dependent upon the magnitudes of the respective currents and resistance values.

Until the initial displacement of first blade 28 out of its initial position, switch S2 is closed, as previously explained. Connection 196 is at an initial value of voltage, namely ground potential, at the instant S1 is closed. When the voltage at connection 196 is at its initial value, and the voltages at the collector and emitter electrodes of $Q_1$ are at their first values of bias voltage due to the conduction of $Q_2$, the collector-base and emitter-base junctions of $Q_1$ are reverse biased, thus resulting in $Q_1$ being cut off.

Meanwhile, the current through solenoid 124 builds rapidly to its maximum value causing the maximum retaining force to be exerted on the second blade 36 shortly after S1 is closed and just prior to release of first blade 28 for movement out of its position of FIGURE 1. The movement of element 106 to release first blade 28 also moves contact 210 of switch S2, thereby opening the same to apply the voltage source across the timing network. The opening of switch S2 thus activates the timing network and causes the latter to generate at connection 196, a time variable voltage that changes from an initial voltage when the network is activated, to a preselected voltage, termed the trigger voltage, in a period of time termed the trigger generation time of the R-C circuit. The trigger voltage is the voltage at which the emitter-base junction of $Q_1$ is forward biased, and until the voltage at connection 196 reaches the trigger voltage, the first value of the bias voltage at resistor 190 reverse biases $Q_1$ to cut off, and $Q_2$ conducts. When the R-C circuit consists of a timing network which includes only element 194 and capacitor $C_1$, the time $t$ required to reach the trigger voltage $V_1$ is given by the following:

$$t = RC \ln \frac{1}{1 - \frac{V_1}{E_0}} \quad (1)$$

where R is the resistance of element 194 as established by the level of scene brightness, C is the capacitance of capacitor $C_1$, and $E_0$ is the battery voltage. The time $t$, or the time for the series combination of the photoconductive element and capacitor means to generate the trigger voltage is termed the "network time." Thus, the trigger generation time of the R-C circuit when the latter consists only of the series combination of the element and capacitor means is the network time. It will be obvious to those skilled in the art that other combinations of photoconductive element and capacitor means could be used to generate the required trigger voltage.

During the time that the timing network is generating the trigger voltage, first blade 28 moves to unblocking position and initiates exposure since the conduction of $Q_2$ causes a current to flow in solenoid 124 that maintains the second blade 36 in its initial position as shown in FIG. 2. Therefore, it may be said that electromagnet 120 is energized to cause the shutter means to initiate exposure. When the voltage at connection 196 reaches the preselected value, it forward biases the emitter-base junction of $Q_1$, and the latter begins to conduct. Initially, the increased collector current of $Q_1$ flowing through bias resistor 186 increases the voltage drop thereacross to lower the voltage at base electrode 192b of $Q_2$. This reduces the forward bias on $Q_2$, decreasing the flow of current through the latter causing the voltage drop across bias resistor 190 to decrease, thereby increasing the forward bias of $Q_1$ even more. This regenerative feedback between the stages of the voltage sensitive trigger circuit causes conduction to switch rapidly from $Q_2$ to $Q_1$, and the different flow of current through bias resistors 186 and 190 after the switching takes place establishing second values of bias voltages at electrodes 182c and 182e of $Q_1$. Thus, the conduction of $Q_2$ is severely and rapidly reduced by the second values of the bias voltages, thereby rapidly deenergizing solenoid 124 to effect a sharp release of second blade 36 as previously described.

Figure 3:
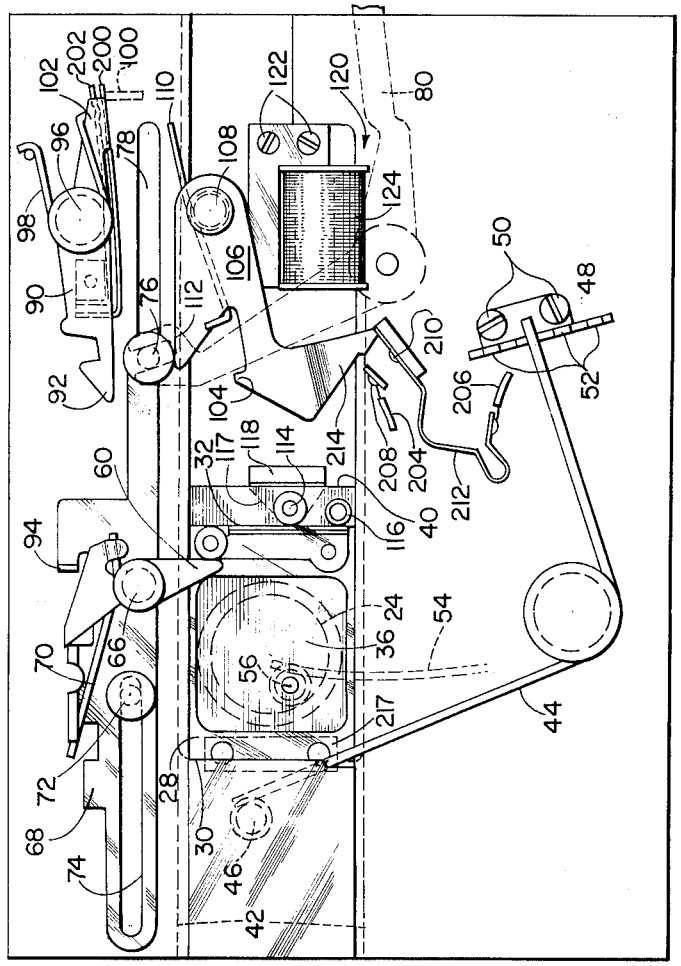
FIG. 3 is also a plan view of the shutter in FIGS. 1 and 2, the elements being shown in the terminal or rest position.

When second blade 36 is released, it begins to move out of its initial position and will terminate exposure at its blocking position, as shown in FIG. 3. Second blade 36 will be stopped in its position of FIG. 3 by contact of pins 114 and 116 with trailing edge 32 of first blade 28. Light trap 217 is attached to first blade and has a lip portion which extends around leading edge of second blade 36. Thus, when the elements are in the position of FIG. 3, light cannot "leak" around the blades and fog or further expose the film.

It can be seen that the time interval between when timing starts (the opening of S2) and when timing stops (the trigger voltage is reached), will be exactly the same as the time interval between when exposure is initiated and when exposure is terminated, provided that the opening blade delay (i.e., the time between opening of S2 and actual initiation of exposure), is the same as the closing blade delay (i.e., the time between reaching trigger voltage and actual termination of exposure), even though the two time intervals are not concurrent throughout. This disclosure assumes the delay times are essentially the same, so that the actual exposure time is essentially the same as the trigger generation time.

It may thus be seen how the shutter elements move to effect an exposure in response to manual actuation by the operator and how the duration of the exposure is controlled automatically by the operation of the trigger circuit. After the exposure has been terminated, the elements are in the position shown in FIG. 3. Cocking lever 80 rotates, as release slide 68 is moved to its position of FIG. 4. In order to return the elements to their initial position of FIGURE 1, the operator manually engages end portion 216 of cocking lever 80, which extends past the edge of base portion 20, and rotates the lever in a counterclockwise direction, as seen in FIG. 4, against the bias of spring 86. End portion 82 is in engagement with pin 76, whereby release slide 68 is moved from left to right, as seen in FIGS. 1–3. Ear portion 60 engages large diameter 62 of fixed pin 63 to move first blade 28 with release slide 68. Trailing edge 32 of the first blade bears against pins 114 and 116 on second blade 36 to move the second blade. As pin 76 is moved out of contact with surface 112, rotatable element 106 is returned to its position of FIGURE 1 by the biasing force of spring 110. The bias of spring 212 returns contact 210 into engagement with contact 208, thus closing switch S2. Tab 94 overrides latching portion 92 to rotate element 90 slightly, against the bias of spring 98, until the tab has passed the latching portion and is again engaged thereby. Small diameter 64 may override latching portion 104 in the same manner.

It should be noted that the relative mounting and arrangement of parts allows for a slight override to prevent damage to the elements in the event that cocking lever 80 is rotated farther than is actually necessary to latch the parts in their initial positions. This also allows wider tolerances in the manufacture and assembly of certain elements of the shutter. Additional rotation of cocking lever 80 after latching portion 92 has engaged tab 94 may move release slide 68 slightly farther to the right than the position shown in FIGURE 1. Since ear portion 60 is pivotally mounted, however, this additional movement of the release slide will result only in rotation of the ear portion about its mounting on pin 66, against the bias of spring 70, since the shutter blades cannot be moved further. That is, one end of ear 60 bears on large diameter 62 of the fixed pin extending from first blade 28; trailing edge 32 of the first blade bears on pins 114 and 116 of second blade 36; and keeper 118, which is attached to the second blade, is in contact with the pole pieces of electromagnet 120, which is anchored to base portion 20. The relatively strong spring bias on ear portion 60, acting through the first blade, also insures that keeper 118 is held in tight contact with electromagnet 120 when the elements are in the initial position of FIGURE 1.

On the surface of diaphragm wheel 26 which faces base portion 20 is a continuous sheet of electrically conductive material 218. Diaphragm wheel 26, or at least the surface thereof which faces base portion 20, is formed of an electrically insulating material. Material 218 may be embedded in diaphragm wheel 26 or may be printed or otherwise applied thereto.

Figure 6:
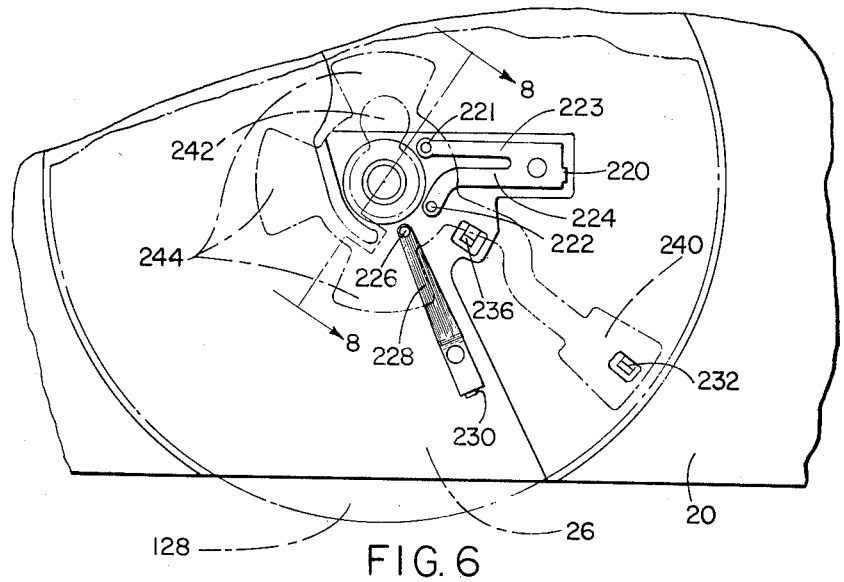
FIG. 6 is a fragmentary front plan view of selected elements of the shutter as seen in FIG. 4, particularly the elements underlying the aperture defining means, which is shown in FIG. 6 in phantom view.
Figure 8:
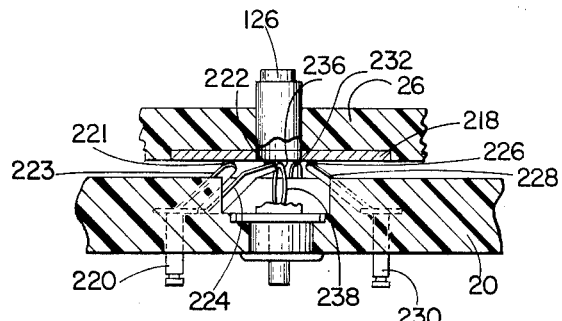
FIG. 8 is a fragmentary view in section on the line 8—8 of FIG. 6.

As best seen in FIGS. 6 and 8, a plurality of spring arms are fastened to base portion 20. These spring arms terminate at their free end in electrical contacts which are urged by the spring force of the arms into contact with the surface of diaphragm wheel 26 which faces base portion 20. Each of the electrical contacts on the ends of the spring arms are adapted to contact a portion of material 218 in at least one of the positions in which diaphragm wheel 26 may be placed. The spring arms serve as a portion of electrical leads from the contacts on one end thereof to one of the capacitors shown in the circuit diagram of FIG. 9. Material 218, being associated with diaphragm wheel 26 for movement therewith, thus forms a commutator switch (S3) between terminal 196 and the various capacitors.

In FIG. 6 is seen a fragmentary portion of base portion 20 which is covered, when viewed from the side of the shutter which faces the scene being photographed, by diaphragm wheel 26. The diaphragm wheel and material 218 thereon are shown in phantom view, overlaying base portion 20 in one of the positions which diaphragm wheel 26 may assume. FIG. 8 is a fragmentary sectional view showing the relative positions of the elements as they would appear from the side when viewed from the position indicated by the section line 8—8 in FIG. 6. Electrical lead 220 extends from contacts 221 and 222 on the ends of spring arms 223 and 224, respectively, to a connection (not shown) with terminal 196. Contact 226 on the end of spring arm 228 is connected, through lead 230, to capacitor $C_2$. Contact 232 is connected through spring arm 234 and associated electrical leads, to capacitor $C_3$. Contact 236 is connected, through spring arm 238, and associated electrical leads, to capacitor $C_4$. The contacts, associated spring arms and electrical leads are schematically shown, so far as practicable, in the circuit diagram of FIG. 9 as well as being physically shown in FIGS. 6 and 8.

It may thus be seen, that material 218 may serve to complete an electrical circuit between two or more of the electrical contacts on the ends of the spring arms. That is, all of the contacts which engage material 218 will be in electrical communication with each of the other contacts which engage the material. Those contacts which engage the surface of diaphragm wheel 26 apart from material 218 will be electrically insulated from the other contacts. For example, when diaphragm wheel 26 is in the position indicated in FIG. 6, contacts 221, 222, 226 and 232 are in engagement with material 218. Thus, capacitors $C_2$ and $C_3$ will be connected in parallel with capacitor $C_1$. Since contact 236 engages the insulating surface of diaphragm wheel 26, capacitor $C_4$ will not be connected in the circuit.

Diaphragm wheel 26 is adapted to be placed in eight different positions of angular rotation, in the manner previously explained. It may be seen from an examination of the configuration of material 218 and the relative positions of contacts 221, 222, 226, 232 and 236, that various combinations of capacitors will be connected in parallel with capacitor $C_1$ as diaphragm wheel 26 is moved throughout its various positions.

The total capacitance of the timing network will therefore vary, being the sum of the capacitances of whatever capacitors are connected in the circuit. Formula 1 may be used to calculate the trigger generation time of the circuit by substituting for the term C the value of total circuit capacitance as determined by the position of S3 which, in turn, is established by the position of diaphragm wheel 26. When the diaphragm wheel is in the position of FIG. 6, contact 232 engages an extending portion 240 of material 218, of relatively narrow width. Consequently, capacitor $C_3$, to which contact 232 is connected, will be included in the timing network at only one angular position of diaphragm wheel 26. A small insulating portion 242 of diaphragm wheel 26 extends from a position near the center of the wheel interiorly of material 218. Contact 226 will be in contact with insulating portion 242 at one position of diphragm wheel 26. Consequently, capacitor $C_2$, to which contact 226 is connected, will be included in the timing network at seven of the eight angular positions of diaphragm wheel 26. It is to be noted that lead 220 from terminal 196 includes two contacts 221 and 222, whereby terminal 196 is always in electrical contact with material 218 even though one of these two contacts may be in engagement with insulating portion 242. Contact 236 is adapted to engage three extending portions 244 of material 218 as diaphragm wheel 26 is rotated. Consequently, capacitor $C_4$ to which contact 236 is connected, will be included in the circuit at three angular positions of diaphragm wheel 26.

For each of the eight angular positions in which diaphragm wheel 26 may be placed a fixed opening of predetermined size defines the aperture through which an aperture may be effected, and the capacitance of the timing network is established in a predetermined manner to result in a trigger generation time which bears a desired functional relationship to the intensity of light received from the scene to be photographed. The following table is presented as an example of suggested relative aperture size and capacitor combinations relative to the angular position of diaphragm wheel 26 for the eight positions thereof. Column I shows the angular position of diaphragm wheel 26 beginning from a reference position indicated as 0°, column II indicates the relative size of the exposure aperture which will be aligned with the optical axis of the camera for the corresponding position of the diaphragm wheel, and column III indicates the capacitor combination which will be included in the timing network at each position of the diaphragm wheel. The aperture sizes are listed in terms of the usual $f$ numbers. The symbols in column III indicate the combinations of capacitors which are included in the timing network as follows:

$$C_A = C_1$$
$$C_B = C_1 + C_2$$
$$C_C = C_1 + C_2 + C_3$$
$$C_D = C_1 + C_2 + C_4$$

| I | II | III |
|---|---|---|
| 0° | 9.25 | $C_A$ |
| 45° | 42.7 | $C_B$ |
| 90° | 37 | $C_D$ |
| 135° | 13.1 | $C_B$ |
| 180° | 26.2 | $C_D$ |
| 225° | 9.25 | $C_D$ |
| 270° | 18.5 | $C_D$ |
| 315° | 9.25 | $C_C$ |

The values of the various capacitors may be so chosen that the total circuit capacitance for each combination, when placed in series with photoconductive element 194 as shown, results in a desired trigger generation time for the particular intensity of light incident on the photoconductive element. The "amount" of light of a particular intensity which is allowed to impinge upon a photosensitive surface when a photographic exposure thereof is effected, is determined by the size of the aperture through which the light enters, and the period of time for which the aperture is uncovered to permit passage of light. The combination of aperture size and exposure duration which results in a particular amount of light of such intensity striking the film being exposed is commonly known as the exposure value. For a particular angular position of diaphragm wheel 26, the exposure value is automatically determined since the aperture size is fixed and the exposure duration is established by the trigger generation time of the circuit which is functionally related to the intensity of scene brightness in such a way as to result in a desired exposure value at each brightness level.

In a hand-held camera it is generally undesirable to have exposures which are longer than one second or so in duration, due to the likelihood of movement of the camera, the subject, or both during exposure. This is, of course, apart from "time" exposures wherein the positions of the camera and subject may be fixed for substantially longer than one second or so. In a shutter mechanism wherein exposure duration is automatically determined in response to scene brightness, it may therefore be undesirable to make exposures with the same fixed aperture under widely varying conditions of scene brightness. This is because the proper exposure time under low brightness conditions will be much longer than, for example, one second even though the exposure time under the brightest conditions is the shortest time which may practicably be obtained within the limitations imposed by the physical construction of the shutter. It is therefore desirable to use a larger exposure aperture under low brightness conditions so that shorter exposure duration may be employed while still obtaining the same "amount" of light on the film.

The above assumes, of course, that a photographic film of the same relative sensitivity is being used under both the light and low conditions of scene brightness, whereby it is necessary to use the same relationship of exposure values to scene brightness. If a film of different sensitivity is to be used it is necessary to provide a different relationship of exposure values to scene brightness in order to achieve proper exposure. This may be done by changing either the size of the exposure aperture or the exposure duration, or both, so that a different amount of light is allowed to strike the film. The relationship between scene brightness and the particular exposure value which is used when making an exposure under such conditions of brightness is termed the "program" of the shutter. That is, if an exposure is effected at a first condition of scene brightness with an exposure value of say 16, it is necessary to change the program of the shutter in order to obtain an exposure value of say 13 at the same brightness level. If it is desired to retain the same relationship between scene brightness and exposure value, but a shorter exposure duration is desired, it is necessary to increase the size of the exposure aperture. Such a cooperative change in both aperture size and exposure duration to retain the same relationship between scene brightness and exposure value is termed a change in the "range" of the shutter.

It has been previously explained how diaphragm wheel 26 may be moved in one manner by engagement of portion 128 thereof, and in another manner by engagement of tab 148 on slide 142. In a preferred embodiment of the present invention, movement of the diaphragm wheel by engagement of portion 128, thus aligning different apertures of the same set with the optical axis, effects changes in the program of the shutter, while movement of the wheel by engagement of tab 148, thus aligning an aperture of a different set with the optical axis, results in changes in the range of the shutter, as defined above. Therefore, if it is desired to use the shutter for exposing a film of different sensitivity than the program of the shutter is presently set to expose properly, wheel 26 is moved by engagement of portion 128. If it is desired to expose the same film under significantly higher or lower conditions of scene brightness than the shutter is presently set to operate under, the range is changed by movement of the wheel through engagement of tab 148. In fact, in the illustrated embodiment of the invention, the only way in which the program may be changed is by movement of the wheel through engagement of portion 128 thereof, and the only way in which the range may be changed is by movement of the wheel through engagement of tab 148. It is to be noted that the same member, namely diaphragm wheel 26, is moved to effect both program and range changes. However, two different means are provided for moving the wheel so that only one type of change in the shutter operation may be effected by movement of either means. It will also be noted that when one of the apertures of the first set (i.e., apertures 24, 131, 133 and 135) is aligned with the optical axis, movement of the wheel by engagement of portion 128 results in alignment of other apertures of the first set with the optical axis, thus changing the program while maintaining the range constant. Movement of the wheel by engagement of tab 148, on the other hand, results in alignment of one of the apertures of the second set (i.e., apertures 130, 132, 134 and 136) with the optical axis, thus changing the range while retaining the same program. In other words, movement of the diaphragm wheel by engaging portion 128 thereof aligns a new aperture of the same set while movement through tab 148 aligns an aperture of the opposite set with the optical axis.

Referring again to FIGS. 4 and 7, slide indicator 246 is mounted for reciprocal sliding movement upon pins 247 and 248 which extend from a fixed mounting on base portion 20 through elongated slot 250 in the indicator. Tabs 252 and 254 extend outwardly from slide indicator 246 in the path of movement of end portion 256 of element 160. As element 160 is moved from the position of FIG. 4 to that of FIG. 7, end portion 256 contacts tab 252 and moves slide indicator 246 towards the left as seen in these two figures. When element 160 is moved from the position of FIG. 7 to that of FIG. 4, end portion 256 contacts tab 254 and moves slide indicator 246 towards the right as seen in these two figures.

Figure 10:
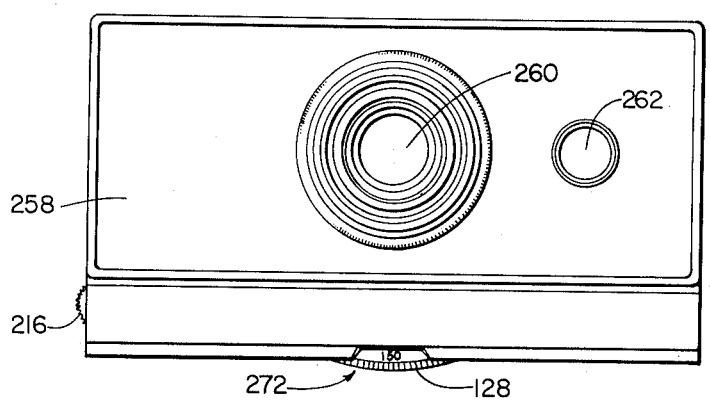
FIG. 10 is a front elevational view of a shutter housing adapted to contain the elements of the shutter mechanism of the invention.

In FIG. 10 is shown the front portion 258 of a housing which is adapted to contain the elements in the shutter mechanism shown in the preceding figures, including the electrical elements of the timing circuit. End portion 216 of cocking lever 80 may be seen at one side of the housing, indicating that the shutter is in the cocked position. Mounted in the front wall of the housing is objective lens 260, defining the optical axis of a camera with which the shutter is associated. Photoconductive element 194 is disposed behind opening 262 which is provided in the front of the housing adjacent the objective lens.

The housing is shown in top view of FIG. 11 wherein it may be seen that front portion 258 mates with rear portion 264 to complete the housing. Opening 266 is provided in the top wall of the housing, being centrally disposed by removing portions of both the front and rear portions of the housing. Through opening 266 may be seen a portion of the upper surface of slide indicator 246. Applied to this surface, as by printing or other appropriate means, are a pair of indicia such as arrows 268. When slide indicator 246 is in the position of FIG. 4, one of the arrows will be visible through opening 266, and when the indicator is in the position of FIG. 7 the other arrow will be visible through the opening. Printed, or otherwise applied to the top of the shutter housing is an array of indicia 270. Thus, when slide indicator 246 is in the position shown in FIG. 11, the visible arrow points to the indicia on the right hand side of opening 266. When slide indicator 246 is in the alternate position, the visible arrow will point to the indicia on the left hand side of the opening. This indicia may be used to provide a visual indication to the operator of the range of brightness levels in which the shutter is set to operate. As previously noted, the range can be changed only by movement of diaphragm wheel 26 through engagement of tab 148. Such movement will result in movement of slide indicator 246 so that the opposite set of indicia will be indicated to the operator.

Another set of indicia 272 is provided on diaphragm wheel 26 and so arranged that one member of such indicia will be visible on portion 128 which extends outside of the shutter housing, as seen in FIG. 10. This set of indicia may be used to indicate, for example, the relative "speed" or sensitivity of film for which the shutter is set to provide proper exposure. As previously mentioned, the shutter program must be changed when the film of a different sensitivity is to be used and the program can be changed only by movement of diaphragm wheel 26 through engagement of portion 128. Thus, each time the program is changed a different portion 128 of diaphragm wheel 26 becomes visible. The illustrated embodiment of the invention is adapted to be set to four different programs, each of which may be used in two different brightness ranges.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:
1. An exposure control mechanism for a camera having a housing, comprising:
  (a) diaphragm means having a plurality of apertures and selectively positionable on said housing so that there is a unique position of said diaphragm means which causes each aperture to be individually aligned with the optical axis of the camera;
  (b) shutter means operably positioned relative to said optical axis for selectively covering and uncovering the aperture aligned with said optical axis so that the amount of light available for exposure depends upon the area of the aperture aligned with said optical axis and the time the latter is uncovered by said shutter means; and
  (c) an electrical circuit to control the time that said shutter means uncovers a given aperture which is aligned with said optical axis in accordance with at least two electrical parameters, one functionally related to the level of brightness of a scene being photographed and the other functionally related to the unique position of said diaphragm means which causes said given aperture to be individually aligned with said optical axis; and
  (d) said electrical circuit being constructed and arranged so that the amount of light causing exposure when a given aperture is individually aligned with said optical axis remains substantially constant over a range of levels of scene brightness.

2. An exposure control mechanism in accordance with claim 1 wherein said diaphragm means contains a first set of apertures such that the amount of light causing exposure when any one of the apertures of said first set is individually aligned with said optical axis is different from the amount of light causing exposure when any other of the apertures of said first set is individually aligned with said optical axis.

3. An exposure control mechanism in accordance with claim 2 wherein said diaphragm means contains a second set of apertures such that the amount of light causing exposure when any one of the apertures of said second set is individually aligned with said optical axis is different from the amount of light causing exposure when any other of the apertures of said second set is individually aligned with said optical axis.

4. An exposure control mechanism in accordance with claim 3 wherein each aperture in said first set of apertures can be paired with an aperture in said second set of apertures such that the amount of light causing exposure is the same when either of a pair of apertures is aligned with said optical axis.

5. An exposure control mechanism in accordance with claim 4 wherein the apertures of a pair have different areas.

6. An exposure control mechanism in accordance with claim 5 including first means operable to position said diaphragm means, and being constructed and arranged so that operation of said first means when an aperture of one of asid sets of apertures is aligned with said optical axis, is effective to move said diaphragm means only to another position at which another aperture of said one set is aligned with said optical axis.

7. An exposure control mechanism in accordance with claim 6 including second means operable to position said diaphragm means, and being constructed and arranged so that operation of said second means, when an aperture of the other of said sets is aligned with said optical axis, is effective to move said diaphragm means only to another position at which another aperture of said other set is aligned with said optical axis.

8. An exposure control mechanism in accordance with claim 1 wherein said electrical circuit includes:
  (a) a photosensitive element exposed to light from said scene and having a resistance which constitutes said one electrical parameter;
  (b) a plurality of capacitor means; and
  (c) electrically conductive means on said diaphragm means constructed and arranged so that each of said unique positions of the latter connects to said element a particular combination of said capacitor means such that the capacitance of said particular combination constitutes said other electrical parameter.

9. An exposure control mechanism in accordance with claim 8 wherein said diaphragm means is rotatably mounted on said housing and each unique position of said diaphragm means constitutes a different angular position thereof.

10. An exposure control mechanism for a camera having a housing, comprising:
  (a) a diaphragm wheel mounted on said housing for rotation about a center displaced from the optical axis of the camera;

17

(b) said wheel having a first set of apertures therein individually alignable with said optical axis by selective rotation of said wheel;
(c) the apertures of said first set thereof being circumferentially spaced at a given angle;
(d) said wheel having a second set of apertures therein individually alignable with said optical axis by selective rotation of said wheel;
(e) the apertures of said second set also being circumferentially spaced at said given angle and spaced from the apertures of said first set by half said given angle;
(f) said wheel having a detent notch therein for each aperture in said first set of apertures, the detent notches being angularly displaced by said given angle; and
(g) detent means mounted on said housing and adjustable from a first position at which apertures of only said first set are alignable with said optical axis in response to rotation of said wheel, to a second position at which apertures of only said second set are alignable with said optical axis in response to rotation of said wheel.

11. An exposure control mechanism in accordance with claim 10 wherein said wheel has a hub at the center thereof in which said detent notches are formed and said detent means includes:
(a) slide means mounted on said housing for sliding movement between terminal positions of adjustment corresponding to said first and second positions;
(b) an arm pivotally mounted at one end to said slide and at the other end to said housing about a point coincident with the center of said wheel so that sliding movement of said slide means between said terminal positions of adjustment causes said arm to pivot about said center through half said given angle; and
(c) a spring loaded detent rigidly attached to said arm and resiliently engaged in a detent notch in said hub.

12. An exposure control mechanism in accordance with claim 11 provided with indicator means actuated by movement of said slide means to said terminal positions.

13. An exposure control mechanism for a camera having a housing, comprising:
(a) a diaphragm wheel mounted on said housing for rotation about a center displaced from the optical axis of the camera;
(b) said wheel having at least two apertures alignable with said optical axis such that said wheel has one distinct angular position at which one of said apertures is alignable with said axis and another distinct angular position at which the other of said apertures is alignable with said axis;
(c) shutter means operably positioned relative to said optical axis for selectively covering and uncovering the aperture aligned with said optical axis so that the amount of light available for exposure depends upon the area of the aperture aligned with said optical axis and the time the latter is uncovered by said shutter means;
(d) a photosensitive element exposed to light from a scene being photographed and having a resistance functionally related to the level of scene brightness;
(e) a plurality of capacitor means;
(f) electrically conductive means on said wheel for connecting to said element a particular combination of said capacitor means such that the capacitance of said particular combination is functionally related to the angular position of said wheel; and
(g) electrical means responsive to the resistance of said element and the capacitance of said capacitor means to regulate the time that said shutter means uncovers a given aperture aligned with said optical axis for controlling the amount of light passed therethrough;

18

(h) the capacitance of said particular combination when said wheel has said one distinct angular position being so related to the area of said one aperture that the amount of light passed therethrough is substantially constant and independent of the level of scene brightness over a range thereof; and
(i) the capacitance of said particular combination when said wheel has said other distinct angular position being so related to the area of said other aperture that the amount of light passed therethrough is substantially constant and independent of the level of scene brightness over a range thereof.

14. An exposure control mechanism in accordance with claim 13 wherein the relationship between the capacitances of said particular combinations of said capacitor means at the two distinct angular positions of said wheel, and the areas of said apertures is such that the amount of light passed through said one aperture when the latter is aligned with said axis is different from the amount of light passed through said other aperture when the latter is aligned with said axis.

15. An exposure control mechanism in accordance with claim 14 wherein indicia means are provided on said wheel for indicating the type of film that will be properly exposed when each aperture is aligned with said optical axis.

16. An exposure control mechanism in accordance with claim 13 wherein the relationship between the capacitances of said particular combinations of said capacitor means at the two distinct angular positions of said wheel and the areas of said apertures is such that the amount of light passed through said one aperture when the latter is aligned with said axis in the same as the amount of light passed through said other aperture when the latter is aligned with said axis.

17. An exposure control mechanism in accordance with claim 16 wherein the areas of said two distinct apertures are different.

18. An exposure control mechanism in accordance with claim 17 wherein indicia is provided on said wheel for indicating the type of film that will be properly exposed when said apertures are aligned with said optical axis.

19. An exposure control mechanism in accordance with claim 18 wherein additional indicia is provided for indicating the range of levels of scene brightness of which the aperture aligned with said optical axis is ideally suited.

20. An exposure control mechanism for a camera having a housing, comprising:
(a) diaphragm means having therein at least two apertures selectively positionable in alignment with the optical axis of said camera;
(b) shutter means operably positioned relative to said optical axis for covering and uncovering the aperture aligned therewith so that the amount of light available for exposure depends upon the area of the aperture aligned with said optical axis and the time the latter is uncovered by said shutter means;
(c) an electrical circuit to control the time that said shutter means uncovers a given aperture which is aligned with said optical axis in accordance with at least two electrical parameters, one functionally related to the level of brightness of a scene being photographed and the other functionally related to the unique position of said diaphragm means which causes said given aperture to be individually aligned with said optical axis;
(d) manually engageable positioning means movable with respect to said housing for selectively moving said diaphragm means between a first position, wherein one of said apertures is aligned with said optical axis, and a second position, wherein the other of said apertures is aligned with said optical axis;
(e) said electrical circuit being constructed and arranged so that the amount of light causing exposure when a given aperture is individually aligned with said optical axis remains substantially constant over a range of levels of scene brightness; and (f) said other electrical parameter being so related to the aperture aligned with said optical axis in each position of said diaphragm means that the amount of light causing exposure when said diaphragm means is in said first position is different from the amount of light causing exposure when said diaphragm means is in said second position.

References Cited by the Examiner

UNITED STATES PATENTS

| | | | |
|---|---|---|---|
| 2,877,697 | 3/59 | Whittier | 95—53.3 |
| 2,969,007 | 1/61 | Groger | 95—10 |
| 2,978,970 | 4/61 | Fahlenberg | 95—53.3 X |
| 2,999,440 | 9/61 | Nerwin | 95—10 |

NORTON ANSHER, *Primary Examiner.*